(12) United States Patent
Fitch et al.

(10) Patent No.: US 7,293,411 B2
(45) Date of Patent: Nov. 13, 2007

(54) ENERGY SCAVENGERS WHICH ADJUST THEIR FREQUENCY BY ALTERING LIQUID DISTRIBUTIONS ON A BEAM

(75) Inventors: John S. Fitch, Los Altos, CA (US); Steven A. Buhler, Sunnyvale, CA (US); Eric Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 504 days.

(21) Appl. No.: 11/017,404

(22) Filed: Dec. 20, 2004

(65) Prior Publication Data

US 2006/0130476 A1    Jun. 22, 2006

(51) Int. Cl.
*F01K 3/00* (2006.01)

(52) U.S. Cl. ............................. 60/509; 60/513; 60/515

(58) Field of Classification Search .................. 60/508, 60/512, 513, 515, 527, 528, 509
See application file for complete search history.

(56) References Cited

U.S. PATENT DOCUMENTS

| | | |
|---|---|---|
| 3,900,748 A | 8/1975 | Adler |
| 4,051,395 A | 9/1977 | Taylor |
| 4,467,236 A | 8/1984 | Kolm et al. |
| 4,504,761 A | 3/1985 | Triplett |
| 4,677,336 A | 6/1987 | Kushida et al. |
| 4,803,392 A | 2/1989 | Kushida et al. |
| 4,841,191 A | 6/1989 | Takada et al. |
| 5,245,245 A | 9/1993 | Goldenberg |
| 5,436,622 A | 7/1995 | Gutman et al. |
| 5,552,657 A | 9/1996 | Epstein et al. |
| 5,751,091 A | 5/1998 | Takahashi et al. |
| 5,801,475 A | 9/1998 | Kimura |
| 5,814,921 A | 9/1998 | Carroll |
| 5,835,996 A | 11/1998 | Hashimoto et al. |
| 5,856,722 A | 1/1999 | Haronian et al. |
| 6,078,126 A | 6/2000 | Rollins et al. |
| 6,205,315 B1 | 3/2001 | Montfort et al. |
| 6,407,484 B1 | 6/2002 | Oliver et al. |
| 6,411,016 B1 | 6/2002 | Umeda et al. |
| 6,448,690 B2 | 9/2002 | Sawai et al. |
| 6,559,550 B2 | 5/2003 | Herman |
| 6,580,177 B1 | 6/2003 | Hagood, IV et al. |

(Continued)

FOREIGN PATENT DOCUMENTS

GB    2326275    12/1998

OTHER PUBLICATIONS

Kitahara et al., "Electrical Phenomena at Interfaces: Fundamentals, Measurements, and Applications," Marcel Dekker, New York, Chap. 6, (1984).

(Continued)

*Primary Examiner*—Hoang Nguyen
(74) *Attorney, Agent, or Firm*—Fay Sharpe LLP

(57) ABSTRACT

A selectively configurable beam and systems utilizing such are disclosed. The distribution of mass of the beam can be selectively adjusted or altered by adjusting one or more characteristics of the beam. Specific strategies utilizing continuous electro-wetting, and selective formation or movement of gases in liquid are disclosed. The selectively configurable beams are used in systems for harvesting vibrational energy from vibrating bodies.

17 Claims, 3 Drawing Sheets

U.S. PATENT DOCUMENTS

| | | |
|---|---|---|
| 6,731,466 B2* | 5/2004 | Arya ........................ 360/244.3 |
| 7,093,818 B2* | 8/2006 | Koeneman ................... 251/208 |
| 2002/0070635 A1 | 6/2002 | Morrison et al. |
| 2002/0074898 A1 | 6/2002 | Maue et al. |
| 2003/0020364 A1 | 1/2003 | Nakatani |
| 2004/0124147 A1* | 7/2004 | Fissell et al. ................ 210/650 |
| 2005/0064581 A1* | 3/2005 | Manalis et al. .......... 435/287.2 |
| 2005/0126606 A1* | 6/2005 | Goedhart et al. ............. 134/42 |
| 2006/0180469 A1* | 8/2006 | Han et al. .................... 204/601 |

OTHER PUBLICATIONS

Lee et al., "Theory and Modeling of Continuous Electrowetting Microactuation," Mechanical and Aerospace Engineering Department, University of California, (1999).

Lee et al., "Microactuation by Continuous Electrowetting Phenomenon and Silicon Deep RIE Process," Mechanical and Aerospace Engineering Department, University of California, (1998).

* cited by examiner

ENERGY SCAVENGERS WHICH ADJUST THEIR FREQUENCY BY ALTERING LIQUID DISTRIBUTIONS ON A BEAM

BACKGROUND

The present exemplary embodiment relates to energy scavengers. It finds particular application in conjunction with cantilevered vibrational energy scavengers, and will be described with particular reference thereto. However, it is to be appreciated that the present exemplary embodiment is also amenable to other like applications.

In designing vibrational energy harvesters, a system must be able to adjust its resonant or natural frequency. This is required so that the resonant frequency of the system is the same as the most energetic, excitation frequency. When this is matched, the energy harvested is optimized. This can be seen in the equation below (from Roundy), which describes the power which may be harvested by a piezo bimorph beam, as a function of mass M, electrical damping E, beam natural frequency $W_n$, excitation frequency W, beam displacement Y, and total damping $\zeta_T$. The power is maximized when the ratio of excitation to natural frequency approaches 1.

$$|P| = \frac{m \xi_e \omega_n \omega^2 \left(\frac{\omega}{\omega_n}\right)^2 Y^2}{\left(2\zeta_T \frac{\omega}{\omega_n}\right)^2 + \left(1 - \left(\frac{\omega}{\omega_n}\right)^2\right)^2}$$

Although apparently feasible at a theoretical level, a need exists for a device and method for optimally harvesting vibrational energy.

BRIEF DESCRIPTION

In accordance with one aspect of the present exemplary embodiment, a beam having a selectively alterable mass distribution is provided. The beam comprises a beam body defining a first end, a second end opposite from the first end, and a hollow region -extending within the beam body. The beam also comprises a first electrode disposed proximate the first end of the beam body. And, the beam comprises a second electrode disposed proximate the second end of the beam body. The beam further comprises a voltage source in electrical communication with each of the first electrode and the second electrode. The beam also comprises an effective amount of an electrolyte disposed in the hollow region. Furthermore, the beam comprises an effective amount of an immiscible liquid disposed in the hollow region defined in the beam body. Upon selective application of a voltage potential between the first and second electrodes, and thus upon the liquids, the liquids can be selectively displaced within the hollow region, thereby altering the mass distribution of the beam.

In accordance with another aspect of the present exemplary embodiment, a beam having a selectively alterable mass distribution is provided. The beam comprises a beam body defining a first end, a second end generally opposite from the first end, and a hollow region extending at least partially between the first end and the second end. The beam also comprises an effective amount of a liquid disposed in the hollow region. The beam further comprises an effective amount of a gas also disposed in the hollow region. And, the beam comprises a heating array adapted to selectively heat a localized area of the hollow region. The heating array is disposed across at least a portion of the hollow region and in thermal communication with the liquid and the gas disposed therein. Upon activation of the heating array, the localized area of the hollow region is heated, thereby displacing the liquid and gas disposed within the hollow region and thus altering the mass distribution of the beam.

In yet another aspect of the present exemplary embodiment, a beam having a selectively alterable mass distribution is provided. The beam comprises a beam body defining a first end, a second end, a first reservoir proximate the first end, a second reservoir proximate the second end, and a channel extending between the first reservoir and the second reservoir. The channel provides flow communication between the first reservoir and the second reservoir. The beam further comprises a first heating element disposed proximate the first reservoir. The beam also comprises a second heating element disposed proximate the second reservoir. And, the beam comprises an effective amount of liquid disposed in at least one of the first reservoir, the second reservoir, and the channel. The beam also comprises an effective amount of a gas disposed in at least one of the first reservoir, the second reservoir, and the channel. Upon actuation of one of the first heating element and the second heating element, the gas locates itself or otherwise evolves near the actuated heating element, thereby altering the mass distribution of the beam.

In accordance with yet another aspect of the present exemplary embodiment, a method for optimizing energy harvest from a vibrating surface is provided. The method comprises providing a beam having a selectively alterable mass distribution. The beam defines an enclosed hollow region and comprises an effective amount of a liquid selectively displaceable within the hollow region upon application of either an electrical potential or thermal energy. The method also comprises identifying the frequency of vibration of the vibrating surface. And, the method comprises altering the mass distribution of the beam by application of either the electrical potential or thermal energy such that the natural frequency of the beam matches or substantially so, the frequency of vibration of the vibrating surface.

DETAILED DESCRIPTION

It is instructive to consider the advantage of changing a beam's frequency by altering various parameters. The natural frequency f equation for a cantilever beam with a significant tip mass is a function of its modulus of elasticity E, width w, thickness t, length l, and masses m.

$$f = \sqrt{\frac{Ewt^3}{4l^3(0.23\, m_{beam} + m_{tip})}}$$

Changing any of these values can alter the frequency, and it is noted that thickness and length changes are more influential than others.

Figure 1:
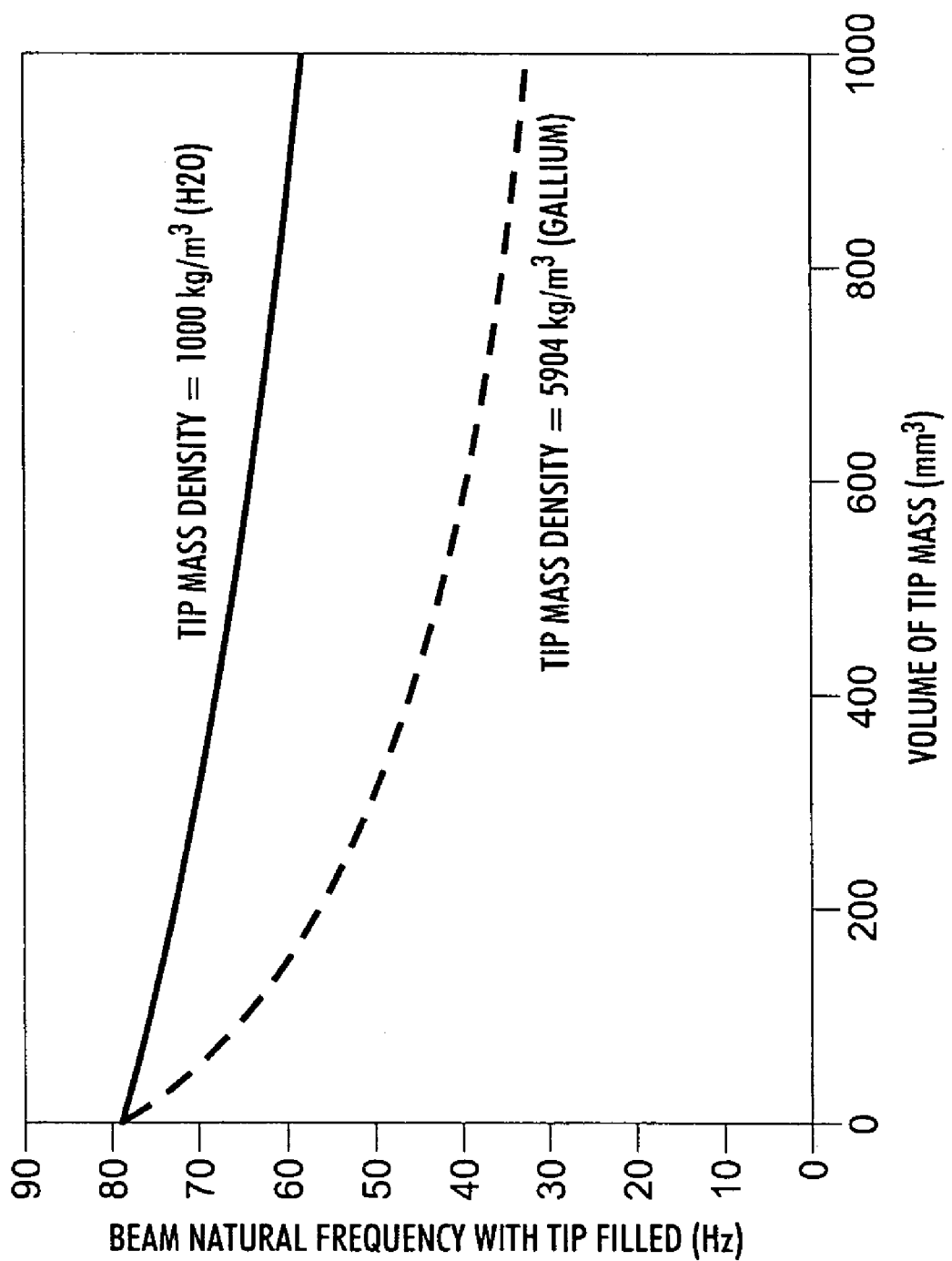
FIG. 1 is a graph illustrating beam natural frequency as a function of tip mass density of an exemplary embodiment system.

FIG. 1 illustrates a beam's natural frequency versus size of tip mass. Here, the beam is 5 mm wide, 0.35 mm thick, 20 mm long, and properties are in the range of a piezo bimorph. It can be seen that the beam's natural frequency can be significantly decreased by increasing the mass of its tip.

The present exemplary embodiment provides several strategies for moving mass along the beam, and toward or further from the tip of the beam. Continuous electro-wetting (CEW) can be used to move a slug of immiscible liquid in a channel defined along the length of a beam. Localized bubble pinning can be utilized to redistribute vapor or noncondensable gas, and therefore liquid, in a channel. This is similar to an optical switch which moves a vapor bubble around in channels. Vapor pumps can be employed which pump liquid from one end, to the other along the length of the beam. Ferromagnetic fluids can be utilized which use magnetic fields to move ferroliquids around along the length of a beam. Electrophoretic flows can be employed, which move heavier particles around in a liquid. Several of these strategies can be utilized particularly as follows.

Continuous Electro-Wetting

Before turning attention to the exemplary embodiment utilizing a continuous electro-wetting strategy, it is instructive to consider the following papers, both of which are hereby incorporated by reference: (1) "Theory and Modeling of Continuous Electrowetting Microactuation," Junghoon Lee and Chang-Jim "CJ" Kim, Mechanical and Aerospace Engineering Department, University of California, Los Angeles, Calif. 90095-1597, presented at the ASME's IMECE99 conference; and (2) "Microactuation by Continuous Electrowetting Phenomenon and Silicon Deep Rie Process," Junghoon Lee and Chang-Jim "CJ" Kim, Mechanical and Aerospace Engineering Department, University of California, Los Angeles, Calif. 90095-1597, presented at the ASME's IMECE98 conference.

One way to maximize the power that may be harvested from a vibrating member is to adjust the mass distribution of the vibrating member. For example, moving mass to the tip of a cantilever beam will lower its resonant frequency. A piezo bimorph beam can be structured so that it has a liquid reservoir at its tip, and another reservoir near its cantilevered end. A fluidic channel is utilized to connect the two reservoirs. A pattern of electrodes is distributed along that channel. Using continuous electro-wetting, with a mixture of immiscible liquid metal and electrolyte, liquid metal may be moved to the tip to add mass. Although the exemplary embodiment is described in terms of a liquid metal and an electrolyte, it will be appreciated that the exemplary embodiment includes any immiscible fluids, such as for example a first and a second fluid, immiscible with respect to each other and wherein the first and second fluids have different densities. Although the use of a liquid metal is beneficial for many applications, the exemplary embodiment includes systems that do not utilize liquid metals. It is however necessary, that at least one of the liquids used in the system be an electrolyte. As used herein, the term "electrolyte" refers to an electrically conductive medium in which current flow is due to the movement of ions. Generally, the electrolyte dissociates into ions. By changing the electrical potential adjacent to a liquid and solid surface, the surface tension may be altered. If the electrical potential is higher on one end of a slug of liquid, forces to move the slug will exist.

Figure 2:
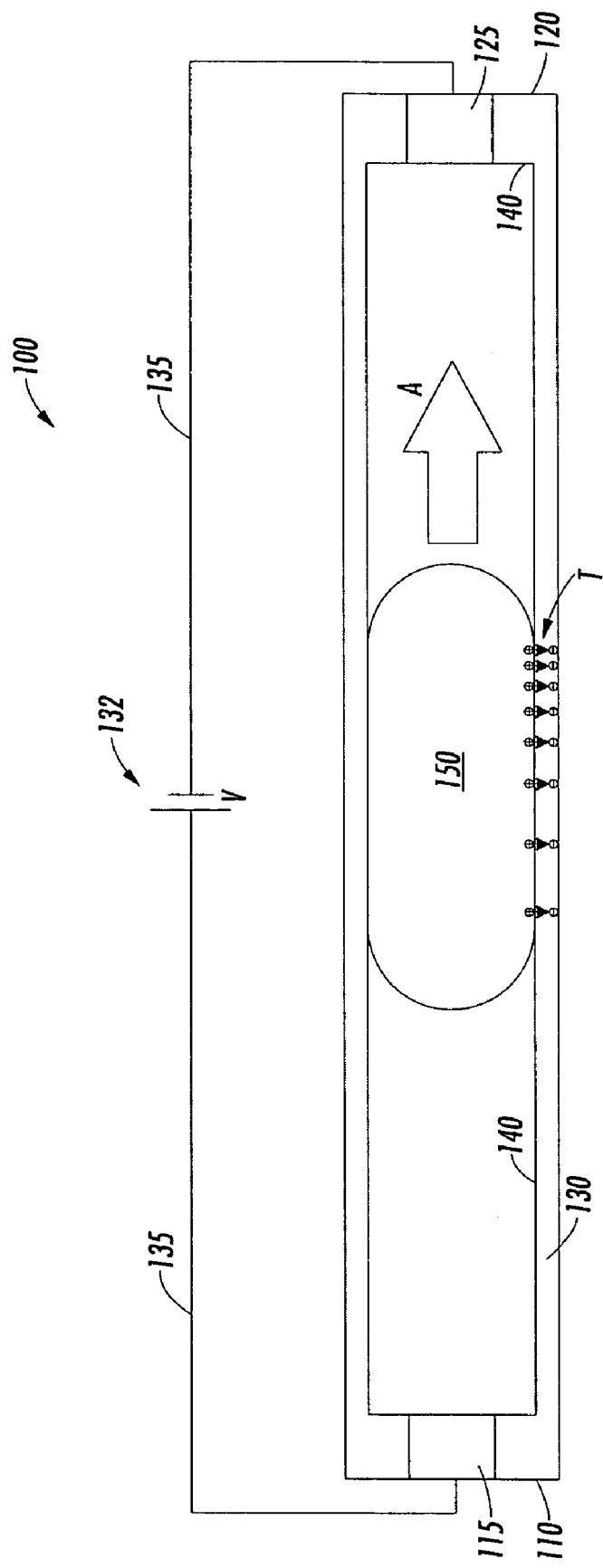
FIG. 2 is a schematic illustration of an exemplary embodiment beam.

FIG. 2 illustrates continuous electro-wetting for providing a net force on a slug of liquid metal. An electric field causes a charge distribution which is unbalanced. In turn the surface tension varies from one end to the other and motion can occur. This can be set up in a loop and with multiple drops per channel.

Specifically, referring to FIG. 2, an exemplary embodiment selectively configurable beam 100 is shown. The beam 100 comprises a first end 110, a second end 120, and a longitudinal body 130 extending therebetween. The body 130 has a longitudinal axis (not shown). Although a longitudinal beam is depicted, the exemplary embodiment includes other beam configurations such as triangular for example. The body 130 defines an interior hollow region 140 extending within the midsection of the body 130. The beam 100 comprises a first electrode 115 disposed at the first end 110 of the beam. The beam 100 also comprises a second electrode 125 disposed at the second end 120 of the beam. Ideally, the region 140 extends to both the electrodes 115 and 125. A voltage source 132 is in electrical communication with the first and second electrodes 115, 125 via an electrical conductor 135. Disposed within the hollow region 140 is a first fluid, such as an electrolyte fluid, and a second immiscible fluid such as a slug of liquid metal 150. The shape of the slug of metal and its position and location within the hollow region 140 is dictated, at least in part, by surface tension T. It will be appreciated that the exemplary embodiment beam 100 utilizes two or more immiscible fluids that differ in density. Generally, as noted, one of the fluids is an electrolyte and the other is a liquid metal. It will be understood that the exemplary embodiment includes other systems such as those free of a liquid metal. The significant features of the systems include the liquids being immiscible with respect to each other, the fluids having different densities, and at least one of the fluids being an electrolyte and thus, electrically conductive.

In operation, the voltage source 132 applies an electrical potential across the length of the beam body 130 and thus, across the length of the hollow region 140. By altering the voltage potential across the region 140, the surface tension T is altered. That is, if the electrical potential is higher at one end of the slug of metal 150, for example the end of the slug proximate the second electrode 125, the slug of metal 150 can be induced to move in the direction of arrow A for example.

This continuous electro-wetting strategy can be employed along a piezo beam structure such that the slug may be specifically positioned along the beam length. Multiple channels can be employed to transport mass in specific fashions. A piezo bimorph laminated structure can be constructed. Located on the free end is a tip reservoir. Disposed on the cantilever end is a supply reservoir. A small diameter channel connects the two. Or, instead, multiple parallel channels can be provided. The channels are constructed as part of the laminated bimorph structure, or could be built with additive processes, such as patterned SU-8. However, stiffness and beam function must be considered in doing so. Patterned electrodes are distributed along the length of the channel. The electrodes may be covered with an insulator if required. This could be done with parylene or other dielectric coatings. The channel and reservoirs are filled with liquid metal, such as gallium or mercury, and electrolyte, such as sodium sulfate or sulfuric acid. The liquid metal is then moved back and forth as voltages are applied to the electrodes. With metal in the tip, the frequency of the beam is lower. To increase the frequency, the metal is moved back to the cantilever end, and replaced with the lighter electrolyte.

To refine the frequency, the slug of mass may be moved to specific locations along the length of the beam. Another way to tune the mass would be to operate multiple, parallel channels in a binary fashion. That is, the mass is either at the tip or the cantilever end, and the total tip mass is adjusted by energizing more or less channels.

It is important to the exemplary embodiment that the method for moving mass does not require a significant amount of 'pumping' energy. It is important to note that once the mass is moved to a desired position, it may require very little energy to maintain its position. If the excitation frequency does not change much, then the substantial energy to tune the beam is only required at one initial time.

Gas Bubble Movement

In accordance with another aspect of the exemplary embodiment, gas bubble can be displaced within a channel defined in a beam to redistribute liquids within the channel and thus alter the mass distribution of the beam. For example, if it is desired to lighten the tip, the bubble may be moved or created near the tip. The bubble can contain either vapor from the surrounding liquid, or noncondensable gas which is loaded with the liquid at manufacture. A distribution of small heating resistors can be utilized which extend along the channel, and they can be energized to specifically position the bubble. There can be several channels in parallel for more refined, or binary operation. This strategy can be used for fine tuning beam performance.

It is known from boiling and heat pipe theory and practice, that a bubble will tend to locate itself in the hottest region of a closed volume. Gravity can overwhelm this in vertical systems or where internal dimensions are large. To satisfy the thermodynamic conditions, a bubble will eventually grow at a heated site, and it will remain there in a quasi-steady state as long as some energy continues to vaporize adjacent liquid. This strategy is used to create bubble optical switches.

A more energy efficient method employs noncondensible gases in the liquid mix. Again, from heat pipe practice, and in designs where internal dimensions or other factors cause surface tension effects to overwhelm gravitational effects, it is known that the noncondensible gas and/or vapor will congregate in the hotter sites. Since the noncondensible gas and/or vapor does not need energy to vaporize, i.e. it is already a gas, the energy required to locate the bubble may be reduced.

Figure 3:
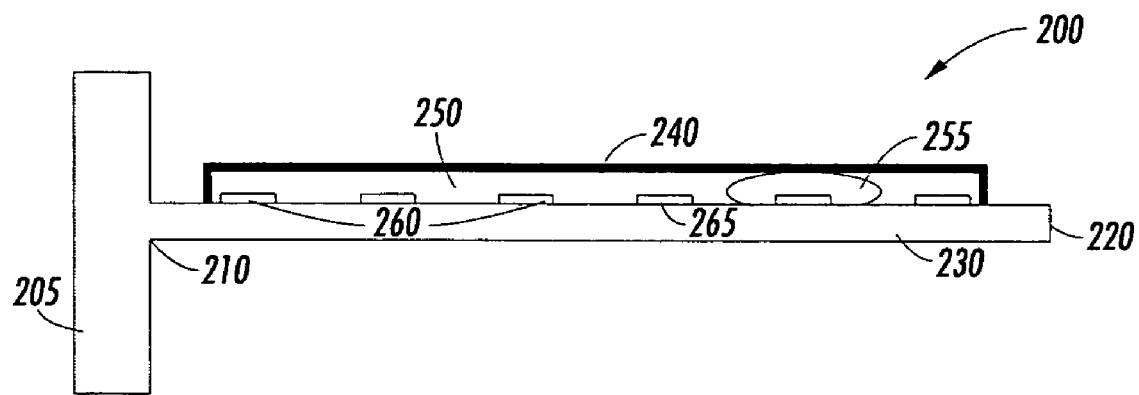
FIG. 3 is a schematic illustration of another exemplary embodiment beam.

FIG. 3 is a schematic side view of an exemplary embodiment beam with electrodes distributed across the length of the beam. A volume of liquid is captured over the electrode array and beam. One energized electrode causes vapor or noncondensible gas to locate in the hotter regions of the beam. This causes the mass to redistribute along the beam. Specifically, FIG. 3 illustrates another exemplary embodiment beam 200 comprising a first end 210, a second end 220, and a longitudinal body 230 extending therebetween. It will be appreciated that the exemplary embodiment includes other beam configurations besides longitudinal beams. The first end 210 can be affixed to a substrate 205. An enclosure 240 extends across the length of the body 230, or at least partially so. The enclosure 240 retains a liquid medium 250 and a gas volume 255 therein. A plurality of heating elements 260, for example, electrical resistors 265, are disposed across the span of the enclosure 240. As will be appreciated, selective heating by activation of one or more elements 260, or resistors 265, cause movement of the gas volume 255 to the regions of highest temperature within the enclosure 240. The enclosure 240 can optionally include one or more "traps" such as in the form of recessed regions that serve to receive and retain at least a portion of the gas volume within the enclosure. These traps can be located at predetermined locations at various points on the beam, or rather along the length of the beam.

Although gas and/or vapor is described herein as moving or traveling through a channel or reservoir upon selective heating, it will be appreciated that gas or vapor may more accurately be described as becoming established or rather evolving or locating near the regions of increasing temperature. More specifically, it is vapor that tends to evolve or arise in the heated regions. And, it is typical that the molecules that constitute the vapor are not necessarily the same molecules that arose within a previously heated region. In contrast, in systems comprising a noncondensible gas, the gas actually moves within the enclosure or containment region and so, the gas tends to redistribute itself towards regions of increasing temperature.

It will be understood that the exemplary embodiment includes the provision of one or more hollow regions or channels extending across the length, or a portion thereof, of the beam 200. The hollow regions or channels can contain a liquid and a gas volume, and be utilized instead of, or in addition to, the enclosure 240. The internal volume, 250, may be constructed with additional features to suit movement of the fluids. For example, a porous structure could wick liquid throughout the volume, due to capillarity effects. Gas could exist in the pores local to heaters 260 to 265.

Vapor and Noncondensible Pump

Similar to the bubble strategy, this strategy utilizes vapor or noncondensible gas to displace liquid. But in this aspect of the exemplary embodiment, the movement is more binary—either the bubble is in the cantilever reservoir, or the tip reservoir. A difference here is that once the bubble is created, very little energy is required to sustain it. A feature or small recess in the channel traps the bubble so that it is inclined to remain in a desired location. Parallel channels can be used to produce different amounts of mass distribution. The gas may attempt to resaturate the liquid, so some energy may be required to overcome this diffusion.

When the gas is needed to be moved to the other end, the flooded electrode is energized. This causes boiling and increased liquid pressure throughout. The liquid starts to displace the noncondensible gas, and it eventually moves to the hotter regions of the system. Gravity is a concern in this design, but can be dealt with to some degree, by careful selection of geometries and fluid properties.

Figure 4:
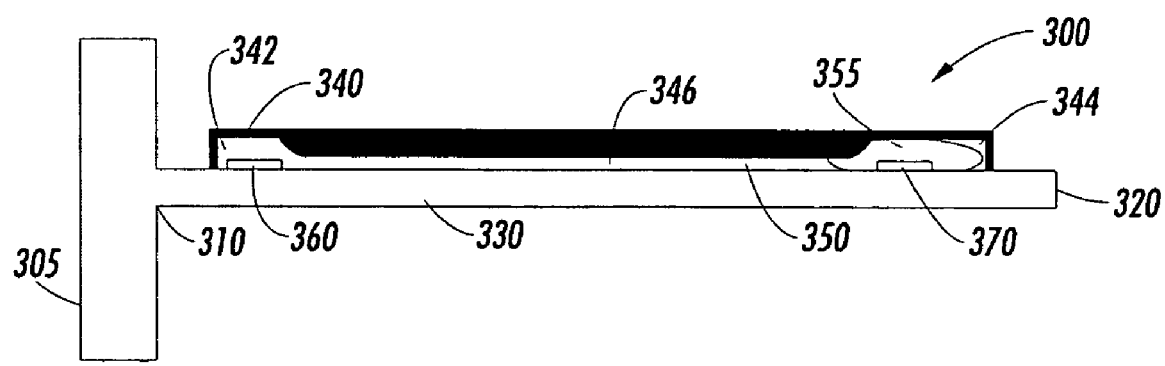
FIG. 4 is a schematic illustration of another exemplary embodiment beam.

FIG. 4 is a schematic side view of another exemplary embodiment beam with electrodes and bubble traps. A volume of liquid is created over the electrode at one end, or the other. Once the energized electrode causes noncondensible gas and/or vapor to gather in the hotter spot, the energy of the electrode may be drastically reduced to an amount which overcomes resaturation of the gas. Features in the channel tend to trap the bubble in that location until the other electrode is energized. Specifically, FIG. 4 illustrates another exemplary embodiment beam 300 including a first end 310, a second end 320, and a longitudinal body 330 extending therebetween. Again, it will be appreciated that the exemplary embodiment includes other beam configurations besides longitudinal beams. The first end 310 can be affixed to a substrate 305. An enclosure 340 extends across the length of the body 330, or at least partially so. The enclosure 340 defines a first reservoir 342 proximate the first end 310 and a second reservoir 344 proximate the second end 320. The enclosure 340 defines a narrowed passage 346 extending between the first and second reservoirs 342, 344. The enclosure 340 retains a volume of liquid 350 and a noncondensible gas 355 within the enclosure. The beam 300 further includes a first heating element 360 disposed within the first reservoir 342, and a second heating element 370 disposed within the second reservoir 344. Either or both of the heating elements 360, 370 can be in the form of electrical resistive heating elements. As will be understood, the distribution of the mass of the beam 300 is selectively changed by actuating either of the heating elements 360 or 370, to thereby induce movement of the gas 355 within the enclosure 340. Specifically, the gas 355 can be induced to travel to, and be retained within, either the first reservoir 342 or the second reservoir 344. The enclosure 340 can optionally include one or more "traps" such as in the form of recessed regions that serve to receive and retain at least a portion of the gas volume within the enclosure. These traps can be located at predetermined locations at various points on the beam, or rather along the length of the beam.

There are several variations on the exemplary embodiment systems. Various electrode patterns can be used to optimize distribution and energy consumption. The exemplary embodiment systems can utilize many different types of liquid combinations. Multiple liquids, such as water, alcohol, immiscible liquids can be used. Channel shapes and features can be varied. Multiple channels generally extending parallel to one another can be used. In addition multiple channels in non-parallel configurations are contemplated. Control schemes for the electrode energizing sequences can be utilized. Porous filling to dampen bubble motion, or enhanced thermodynamic and heat transfer distributions can be used. Thermal expansion of a volume to displace the liquid or gases can be used.

Containment structures, such as 240, 340, may be made of low thermal conductivity and low thermal mass materials to minimize the thermal energy required to create bubbles. They may also be structured in a way to minimize thermal paths to the outside, such as with hollow, evacuated wall structures.

Heaters, such as 260, 265, 360, 370 may be designed to optimize heating of the fluidics and minimize losses. For example, the resistive part of the heater may be built off the structures 230, 330, so that they are enveloped by liquid when heating starts. This minimizes the thermal path to the outside.

The various exemplary embodiment beams can be used to harvest vibrational energy as follows. One or more beams, or arrays of beams, are secured to a vibrating substrate or surface. Knowing, calculating or estimating the natural frequency of a beam can be performed as described herein. Then, the mass distribution of the beam, or collection of beams, is adjusted such that the natural frequency of the beam matches the frequency of vibration of the substrate or surface. Once matched, the energy that can be harvested from the beam or collections of beams is optimized.

In accordance with the exemplary embodiment, a specific method for collecting vibrational energy from a vibrating surface using the beams described herein is as follows. One or more exemplary embodiment beams as described herein are provided and attached to the vibrating surface under consideration. The attachment can be performed in any manner, however adhesive and mechanical affixment techniques are contemplated. The natural frequency of the beam or set of beams is identified or otherwise estimated. The frequency of the vibrating surface is also identified. It is likely that the natural frequency of the beam at this juncture is different than the frequency of the vibrating surface. The mass distribution of the beam is then adjusted so that the natural frequency of the beam approaches, and ideally matches, the frequency of the vibrating surface.

In the event that the frequency of the vibrating surface changes overtime, it is contemplated to use a vibration sensor and feedback loop to a controller to actively alter the mass distribution of the beam(s) and thus adjust the natural frequency of the beam(s) according to changes in the vibration frequency of the surface.

As will be appreciated, although it may be difficult to exactly match the natural frequency of a beam to the vibration frequency of a moving surface or substrate, significant increases in energy harvesting can be realized by changing the beam's natural frequency to a value closer to the vibration frequency, and ideally, within 25%, or more ideally, within 10% of the vibration frequency of the surface or substrate.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A beam having a selectively alterable mass distribution, the beam comprising:
   a beam body defining a first end, a second end opposite from the first end, and a hollow region extending within the beam body;
   a first electrode disposed proximate the first end of the beam body;
   a second electrode disposed proximate the second end of the beam body;
   a voltage source in electrical communication with each of the first electrode and the second electrode;
   an effective amount of liquid electrolyte disposed in the hollow region defined in the beam body; and
   an effective amount of an immiscible liquid disposed in the hollow region defined in the beam body;
   wherein upon selective application of a voltage potential between the first and second electrodes, the liquids can be selectively displaced within the hollow region, thereby altering the mass distribution of the beam.

2. The selectively alterable beam of claim 1 where the immiscible liquid is selected from the group consisting of gallium and mercury.

3. The selectively alterable beam of claim 1 wherein the electrolyte is selected from the group consisting of sodium sulfate and sulfuric acid.

4. The selectively alterable beam of claim 1 wherein the hollow region is a first channel extending across at least a portion of the length of the beam, the beam further defining a second channel generally extending parallel to the first channel, the beam further comprising:
   an effective amount of a liquid metal disposed in the second channel.

5. A beam having a selectively alterable mass distribution, the beam comprising:
   a beam body defining a first end, a second end generally opposite from the first end, and a hollow region extending at least partially between the first end and the second end;
   an effective amount of a liquid disposed in the hollow region;
   an effective amount of a gas also disposed in the hollow region; and
   a heating array adapted to selectively heat a localized area of the hollow region, the heating array disposed across at least a portion of the hollow region and in thermal communication with the liquid and the gas disposed therein;

whereby upon actuation of the heating array, the localized area of the hollow region is heated, thereby displacing the liquid and gas disposed within the hollow region and thus altering the mass distribution of the beam.

6. The selectively alterable beam of claim 5 wherein the heating array is a plurality of electrical resistors.

7. The selectively alterable beam of claim 5 wherein the hollow region is a first channel, the beam further defining a second channel generally parallel with the first channel, the beam further comprising:
   a liquid disposed in the second channel; and a gas disposed in the second channel.

8. The selectively alterable beam of claim 5 wherein the gas comprises vapor from the liquid.

9. The selectively alterable beam of claim 5 wherein the gas comprises a noncondensible gas and vapor from the liquid.

10. The selectively alterable beam of claim 5 wherein the hollow region is provided by an enclosure disposed along at least a portion of the length of the beam, the enclosure retaining the liquid and the gas.

11. The selectively alterable beam of claim 5 wherein the hollow region defines at least one recessed trap adapted to receive and retain at least a portion of the gas disposed in the hollow region.

12. A beam having a selectively alterable mass distribution, the beam comprising:
   a longitudinal beam body defining a first end, a second end, a first reservoir proximate the first end, a second reservoir proximate the second end, and a channel extending between the first reservoir and the second reservoir, the channel providing flow communication between the first reservoir and the second reservoir;
   a first heating element disposed proximate the first reservoir;
   a second heating element disposed proximate the second reservoir;
   an effective amount of liquid disposed in at least one of the first reservoir, the second reservoir, and the channel; and
   an effective amount of a gas disposed in at least one of the first reservoir, the second reservoir, and the channel;
   whereby upon actuation of one of the first heating element and the second heating element, the gas locates proximate the actuated heating element, thereby altering the mass distribution of the beam.

13. The selectively alterable beam of claim 12 wherein at least one of the first heating element and the second heating element is an electrical resistive heating element.

14. The selectively alterable beam of claim 12 wherein the channel is a first channel, the beam further defining a second channel extending generally parallel with the first channel and extending between the first and second reservoirs, the beam further comprising:
   a liquid disposed in the second channel; and
   a gas disposed in the second channel.

15. The selectively alterable beam of claim 12 wherein the gas is selected from the group consisting of (i) vapor from the liquid, (ii) noncondensible gas, and (iii) combinations thereof.

16. The selectively alterable beam of claim 12 wherein the channel defines at least one recessed trap adapted to receive and retain at least a portion of the gas disposed in the channel.

17. A method for optimizing energy harvest from a vibrating surface, the method comprising:
   providing a beam having a selectively alterable mass distribution, the beam defining an enclosed hollow region and comprising an effective amount of a liquid selectively displaceable within the hollow region upon application of either an electrical potential or thermal energy;
   identifying the frequency of vibration of the vibrating surface; and altering the mass distribution of the beam by application of either the electrical potential or thermal energy such that the natural frequency of the beam matches or substantially so, the frequency of vibration of the vibrating surface.

* * * * *